United States Patent [19]

Egbert et al.

[11] 4,018,589
[45] Apr. 19, 1977

[54] GLASS SHAPING FORM MOLD

[75] Inventors: William D. Egbert; Wilson C. McDonald, both of Phoenix, Ariz.

[73] Assignee: Goodyear Aerospace Corporation, Akron, Ohio

[22] Filed: Jan. 22, 1976

[21] Appl. No.: 651,313

[52] U.S. Cl. .................... 65/287; 65/291
[51] Int. Cl.[2] .......................... C03B 23/02
[58] Field of Search .......... 65/26, 106, 107, 273, 65/287, 291

[56] References Cited

UNITED STATES PATENTS

| | | | |
|---|---|---|---|
| 2,560,599 | 7/1951 | Ryan | 65/287 |
| 3,367,764 | 2/1968 | Seymour | 65/273 X |

*Primary Examiner*—Arthur D. Kellogg
*Attorney, Agent, or Firm*—J. G. Pere

[57] ABSTRACT

A form for shaping softened glass on a full-contact mold without spalling or mark-off. The invention includes a base having a plurality of threaded rods extending vertically therefrom; each rod having a trunnion threaded thereon for adjusting purposes. The trunnions make engagement with support members which maintain a mold sheet for forming the glass. The support members may have clamps on them at each end thereof for purposes of securing the mold sheet. In a preferred embodiment of the invention a lubricated plane is provided over the forming sheet; the lubricating plane preferably comprising a powder-impregnated fiber glass sheet.

5 Claims, 2 Drawing Figures

GLASS SHAPING FORM MOLD

BACKGROUND OF THE INVENTION

Applicants herein have, for a number of years, been actively engaged in the art of transparent armor manufacture and development. Such armor, as is well known in the art, consists of a laminate structure of one or more plies of glass and covered with a plastic ply of any suitable material having a high tensile strength. Such laminate structures have been constructed for bulletproof windshields, screens and the like and consequently are most generally of a non-planar construction. Problems arising in developing such laminate structures result from the fact that total registry or congruency is necessary between the plies of the structure to provide for the requisite strength and optical characteristics.

To date, manufacturers of glass plies for transparent armor structures have formed the glass by utilizing a peripheral or picture frame mold whereby a flat glass sheet is secured about the periphery thereof and heated in an oven to its softening point. While remaining at this temperature for some period of time, a sag develops within the plate glass sheet and the forming process is thus achieved according to particular characteristics of the peripheral form. Critical problems have arisen utilizing such forms in that the amount of sag created in a glass sheet is dependent upon various parameters such as the temperature at which it is formed, the time duration of forming, and variations within the glass itself from lot to lot. Consequently, total registration or congruency between glass sheets is impossible and adherence thereto of the cast-formed plastic protective sheet is extremely difficult and expensive to achieve.

Heretofore in the art no approach has been taken to form such glass sheets with full-contact molds since a markoff or spalling effect is imparted to the glass sheets when molded upon a solid surface. For instance, if a planar glass sheet is placed atop a mold (either male or female) and heated so as to take the form of the mold, the frictional contact areas of the glass sheet with the solid mold will distort the glass and severely degrade the optical characteristics thereof. Even when using a peripheral mold as hereinabove mentioned, a spalling effect occurs about the periphery of the glass sheet where the same is held by the mold.

Consequently it is an object of the instant invention to provide a glass shaping form of the full-contact type for forming curvate glass elements for utilization in laminate structures.

It is another object of the invention to present a glass shaping form which is adjustable in nature so as to be conducive to the forming of any of numerous contours.

Yet a further object of the invention is to present a glass shaping form which is conducive to shaping glass into curvate and arcuate configurations while circumventing the aforementioned problems of mark-off and spalling.

Still another object of the invention is to present a glass shaping form which is simplictic in nature, adjustable and reliable in operation, and quite inexpensive with respect to prior art structures and techniques.

These objects and other objects which will become apparent as the detailed description proceeds are achieved by: a device for shaping planar sheets of glass into curvate configurations without spalling or markoff comprising: a base; a plurality of threaded rods rotatably received within said base and vertically extending therefrom; a plurality of trunnion assemblies threadily engaged with each of said rods; support members interconnected between said trunnion assemblies; and a mold plate maintained atop said support members.

DESCRIPTION OF DRAWING

For a complete understanding of the structure and technique of the invention, reference should be had to the following detailed description and accompanying drawing wherein.

DESCRIPTION OF PREFERRED EMBODIMENT

Figure 1:
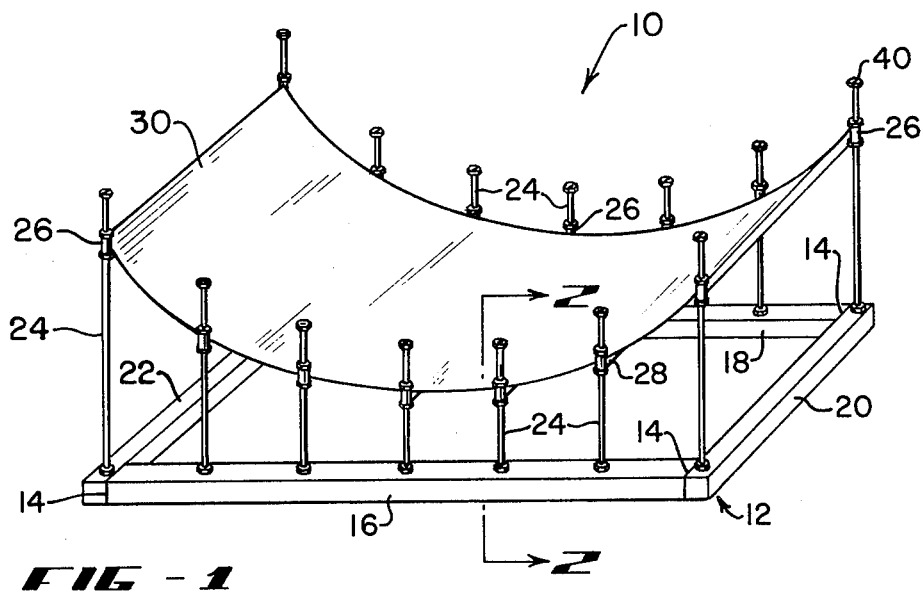
FIG. 1 is a pictorial view of a preferred embodiment of the glass shaping form of the invention.

With reference now to the drawing, it can be seen that the structure of the preferred embodiment of the invention is designated generally by the numeral 10. In the embodiment shown, a base 12 of substantially rectangular nature is constructed by the securing together of four channel members 16–22 by appropriate weld joints 14. Of course, any suitable base may be utilized while staying within the confines of the invention. Extending vertically from the base 12 along the channel members 16,18 are a plurality of spaced rods 24. The rods 24, as will be elaborated upon herein, are threaded and each has connected thereto a trunnion assembly 26. It should be noted that the rods 24, perpendicularly spaced along the channel members 16, are directly opposite an equivalent number of rods 24 similarly spaced along the channel member 18. Interconnecting these oppositely positioned rods 24 are horizontal support members 28 which are maintained between the respective trunnion assemblies 26. The support members 28 may be of any suitable nature but, for purposes of the preferred embodiment, are shown as being steel angles. Maintained on top of the support members 28 is the full-contact curvate mold sheet 30 which may again be of any suitable nature such as borosilicate glass, steel, aluminum or the like. Preferably, with consideration being given to expansion and contraction coefficients, the form 30 is of a steel construction. Of course, the form sheet 30 is of the same arcuate or curvate nature as is the desired form of the final glass product.

Figure 2:
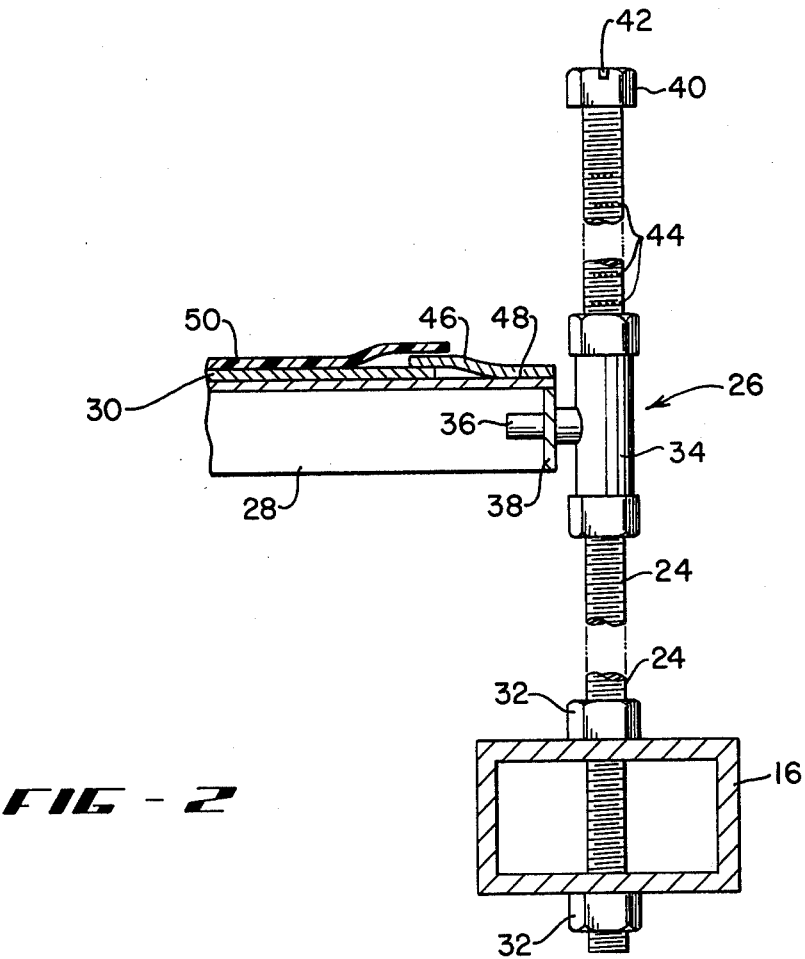
FIG. 2 is a sectional view of the embodiment of the invention shown in FIG. 1 taken along the line 2—2.

With reference now to FIG. 2, a better understanding of the structure and functioning of the invention may be had. As can be seen, the threaded rod 24 extends through the channel member 16 and is maintained on either side thereof by nuts 32. A trunnion fitting 34 is threadedly maintained about the threaded rod and engages the trunnion 36 which itself is secured to a plate 38 which is welded or otherwise appropriately affixed to the angle member 28. As is well known in the art, the trunnion 36 is pivotally engaged with the trunnion fitting 34. The rod 24 is fixed at an upper end with a bolt head 40 or screwdriver slot 42 to facilitate rotational movement of the threaded rod 24. Such rotation will cause the trunnion assembly 26 to ascend or decend on the rod 24 in much the same manner as a worm gear. Such movement of the trunnion fitting 26 is communicated through the trunnion 34 to the horizontal support member 28 to raise or lower the form sheet 30. Of course, the rod 24 may be appropriately calibrated and graduated as at 44 so that appropriate positioning may be achieved.

As is also shown in FIG. 2, the trunnion assembly 26 may further include spring steel clamps 46 operative for making securing engagement with the form sheet 30. The clamps 46 may be appropriately secured to the support members 28 by welding, as at 48, or other appropriate means.

Also included as a part and parcel of the invention is a slip sheet or lubricant plane 50 which may be placed over the form sheet 30 for purposes of alleviating mark-off and spalling during the forming operation. While such lubricant plane 50 may have any numerous suitable characteristics, the applicants have found that a fiber glass cloth sheet of a thickness from 0.002 inches to around 0.020 inches provide very adequately for such purpose. Applicants have further found that an idealized situation may be achieved when the fiber glass sheet used for the plane 50 is impregnated with a powder such as soap stone or ordinary talcum powder. Such powder does not degrade the quality of the glass since it readily brushes off after the forming process. Of course, the unit 10 need not specifically include the slip plane 50 but the best results have been found to be achieved when the same is used since spalling and mark-off results in severe degradation of optical qualities.

It should now be readily appreciated that the instant invention may be utilized for the forming of glass and the like by adjusting the plurality of threaded rods 24 and the associated trunnion-held horizontal support members 28 to receive the desired mold. With a slip plane 50 placed on top of the form sheet 30, a layer of flat glass may be positioned on the sheet 30 and the combination of the form 10 and glass sheet be placed in a heating oven. When the glass reaches the softening point, it begins to take the contour of the form sheet 30 and, by carefully monitoring time and temperature, glass sheets may be repeatedly formed on this mold having identically congruent characteristics. Of course, although a female mold has been shown in FIG. 1, it is to be understood that the invention could also utilize a male mold which, for the same contour, could be achieved by flipping the sheet 30 about any axis and repositioning the same upon the trunnion assemblies 26.

While in accordance with the patent statutes only the best mode and preferred embodiment of the invention has been presented and described in detail, it is to be understood that the invention is not limited thereto or thereby. Consequently, for an appreciation of the true scope and breadth of the invention, reference should be had to the following claims.

What is claimed is:

1. A form for shaping planar sheets of glass into curvate configurations, comprising:
    a base having opposed spaced apart sides;
    a first plurality of horizontal support members having a trunnion affixed to each of two ends thereof;
    a second plurality of threaded rods, rotatable within and extending upwardly from said spaced apart sides of said base and having a trunnion fitting threaded thereon, said support members extending between pairs of said rods on opposite sides of said base and wherein the trunnions of each of said support members engage the trunnion fittings of the associated rods;
    clamps affixed to each of the two ends of said support members; and
    a full contact flexible mold plate maintained upon said support members and secured about its periphery by said clamps.

2. The form for shaping planar sheets of glass as recited in claim 1 wherein said rods are calibrated and have means thereon for rotating said rods within said base to affectuate movement of the associated trunnion fittings.

3. The form for shaping planar sheets of glass as recited in claim 1 wherein said clamps are of spring-steel construction.

4. The form for shaping planar sheets of glass as recited in claim 3 which further includes a powder-impregnated fiber glass strip plane placed atop said mold plate.

5. A device for shaping planar sheets of glass into curvate configurations without spalling or mark-off, comprising:
    a base having opposed sides;
    a plurality of threaded rods rotatably received within said opposed sides of said base and vertically extending therefrom;
    a plurality of trunnion assemblies threadily engaged with each of said rods;
    horizontal support members interconnected between said trunnion assemblies and having spring-steel clamps at each end thereof; and
    a flexible plate maintained atop said horizontal support members and secured about the periphery thereof by said clamps.

* * * * *